United States Patent [19]
Shimizu

[11] Patent Number: 6,122,586
[45] Date of Patent: Sep. 19, 2000

[54] VEHICLE VELOCITY DETECTING DEVICE

[75] Inventor: Kouichi Shimizu, Kanagawa-ken, Japan

[73] Assignee: Nissan Motor Co., Ltd., Yokohama, Japan

[21] Appl. No.: 09/342,735

[22] Filed: Jun. 29, 1999

[30] Foreign Application Priority Data

Jul. 2, 1998 [JP] Japan .................................. 10-187331

[51] Int. Cl.$^7$ .............................. B60R 16/00; G01P 11/00
[52] U.S. Cl. ................................ 701/74; 701/72; 701/75; 701/76; 180/197; 702/148
[58] Field of Search .................... 701/70, 71, 72, 701/74, 75, 76; 180/197; 303/159; 702/145, 146, 148, 56

[56] References Cited

U.S. PATENT DOCUMENTS

| | | | |
|---|---|---|---|
| 3,874,741 | 4/1975 | Schnaibel et al. ...................... | 303/159 |
| 4,468,740 | 8/1984 | Beck et al. ................................. | 701/76 |
| 4,497,026 | 1/1985 | Braschel et al. ........................... | 701/76 |
| 4,670,852 | 6/1987 | Masaki et al. ............................. | 701/76 |
| 4,982,806 | 1/1991 | Yoshizawa et al. ....................... | 701/75 |
| 5,099,443 | 3/1992 | Higashimata et al. .................... | 701/76 |
| 5,185,702 | 2/1993 | Okubo ....................................... | 701/75 |
| 5,748,503 | 5/1998 | Saeki et al. ............................... | 701/74 |
| 5,749,062 | 5/1998 | Yamamoto et al. ....................... | 701/75 |
| 5,819,193 | 10/1998 | Burgdorf et al. ......................... | 701/75 |
| 6,026,343 | 2/2000 | Ogino ....................................... | 701/75 |

FOREIGN PATENT DOCUMENTS 9-272421  10/1997  Japan .

*Primary Examiner*—Gary Chin
*Attorney, Agent, or Firm*—Foley & Lardner

[57] ABSTRACT

A vehicle velocity detecting device is provided for a vehicle. In the device, velocity range in which a difference among respective wheel speeds is caused due to brake noise is defined as a range of speed smaller than a designated velocity $V_0$. When an average of driving wheels' speeds $Vw_{Dave}$ is smaller than the designated velocity $V_0$ and the vehicle is under a great turning condition containing the straight traveling condition, then the smallest wheel speed $Vw_{MIN}$ is set to a vehicle velocity $V_{sp}$ in order to exclude the wheel speed being influenced by noise. While, when the vehicle is under a small turning condition where the wheel speed of turning inside wheel is smaller in spite of the same velocity range, the third wheel speed from the largest one is set to the vehicle velocity $V_{sp}$ to exclude the turning wheel speed. In the velocity range besides both turning conditions, the average of driving wheels' speeds $Vw_{Dave}$ is set to the vehicle velocity $V_{sp}$, so that it is possible to attain the vehicle velocity similar to that detected by a earlier vehicle speed sensor for converting the rotating speed of an output shaft of a transmission.

6 Claims, 3 Drawing Sheets

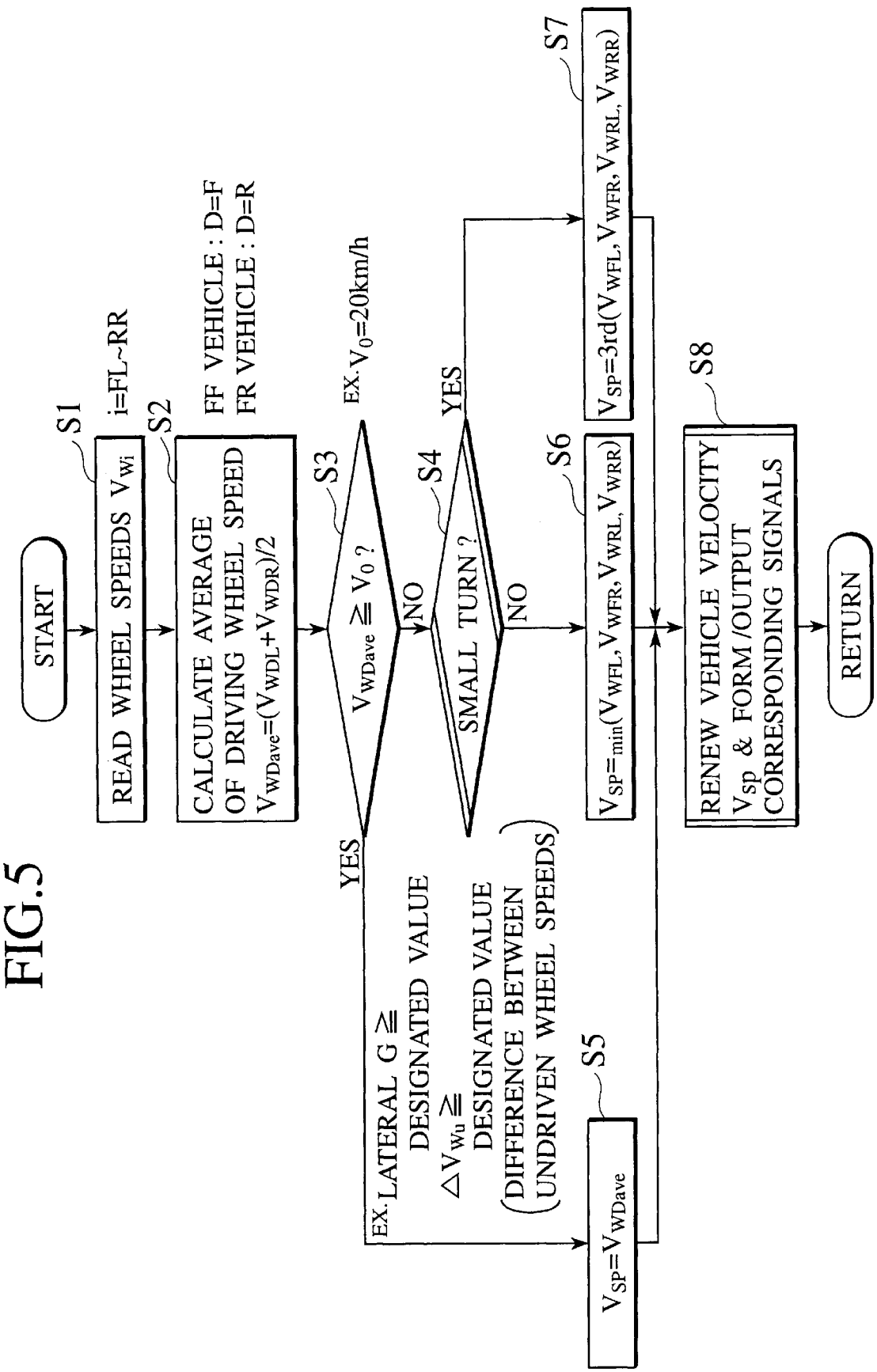

VEHICLE VELOCITY DETECTING DEVICE

BACKGROUND OF THE INVENTION

1. Field of the Invention

The present invention relates to a vehicle velocity detecting device which can detect the velocity of a vehicle and display it on e.g. an instrument panel by using values detected by wheel speed sensors arranged on respective wheels in the anti-lock brake control apparatus.

2. Description of the Related Art

In the conventional vehicle, it has been generally carried out to detect a rotating speed of an output shaft of the transmission apparatus, in other words, an average of rotating speeds of driving wheels and display it on e.g. a speed meter of the instrument panel, as "vehicle velocity". While, the vehicle velocity detecting device disclosed in Japanese Unexamined Patent Publication (kokai) No. 9-272421 detects the vehicle velocity by processing signals generated from the rotating speed sensors arranged on respective wheels in the anti-lock brake control apparatus.

Now, although the above-mentioned earlier vehicle velocity detecting device adopts an average of driving wheels' speeds detected by the wheel rotating speed sensors of the anti-lock braking control apparatus as the vehicle velocity, the device has a problem that the wheel speeds detected by the wheel rotating speed sensors may contain undesirable noises, different from the rotating speed obtained by the rotating speed sensor detecting revolutions of the output shaft of the transmission apparatus. In detail, it is believed that the occurrence of noises originates in the vibrations of disc rotors and brake pads of the wheels, the magnetic field generated from cables embedded in the ground a road, or the like. Consequently, under a specific condition, the vehicle velocity detecting device incorrectly detects the wheels speed which is apt to be normally larger than the actual rotating speed of the wheel.

SUMMARY OF THE INVENTION

It is therefore an object of the present invention to provide a vehicle velocity detecting device which is capable of excluding the influence of noise as possible, in detecting the vehicle velocity on employment of the wheel speeds detected by the wheel speed detecting units, such as wheel speed sensors, thereby to detect the accurate vehicle velocity.

According to the present invention, the above-mentioned object of the present invention can be accomplished by a vehicle velocity detecting device for detecting vehicle velocity of a vehicle by using rotating speeds of at least four wheels of the vehicle, the vehicle velocity detecting device comprising:

a wheel speed detecting unit for detecting the rotating speeds of the four wheels as respective wheel speed, individually;

a turning condition detecting unit for detecting the vehicle's turning condition; and a vehicle velocity detecting unit for detecting the vehicle velocity;

wherein when the vehicle's turning condition detected by the turning condition detecting unit is a small turning condition, the vehicle velocity detecting unit does adopt the third wheel speed from the largest one in the respective wheel speeds of the four wheels detected by the wheel speed detecting unit, as the vehicle velocity to be detected; and when the vehicle's turning condition detected by the turning condition detecting unit is a great turning condition containing a straight traveling condition, the vehicle velocity detecting unit does adopt the smallest wheel speed in the respective wheel speeds of the four wheels detected by the wheel speed detecting unit, as the vehicle velocity to be detected.

According to the invention, there is also provided a vehicle velocity detecting device for detecting vehicle velocity of a vehicle by using rotating speeds of at least four wheels of the vehicle, the vehicle velocity detecting device comprising:

first means for detecting the rotating speeds of the four wheels as respective wheel speed, individually;

second means for detecting the vehicle's turning condition; and third means for detecting the vehicle velocity;

wherein when the vehicle's turning condition detected by the second means is a small turning condition, the third means does adopt the third wheel speed from the largest one in the respective wheel speeds of the four wheels detected by the first means, as the vehicle velocity to be detected; and when the vehicle's turning condition detected by the second means is a great turning condition containing a straight traveling condition, the third means does adopt the smallest wheel speed in the respective wheel speeds of the four wheels detected by the first means, as the vehicle velocity to be detected.

The above and other features and advantages of this invention will become apparent, and the invention itself will best be understood, from a study of the following description and appended claims, with reference to the attached drawings showing some preferred embodiments of the invention.

BRIEF DESCRIPTION OF THE DRAWINGS

FIG. 5 is a flow chart showing the vehicle velocity calculating process executed in the microcomputer of FIG. 1, in accordance with an embodiment of the invention.

DESCRIPTION OF THE PREFERRED EMBODIMENT

Referring to the attached drawings, we now describe a vehicle velocity detecting device in accordance with an embodiment of the present invention.

Figure 1:
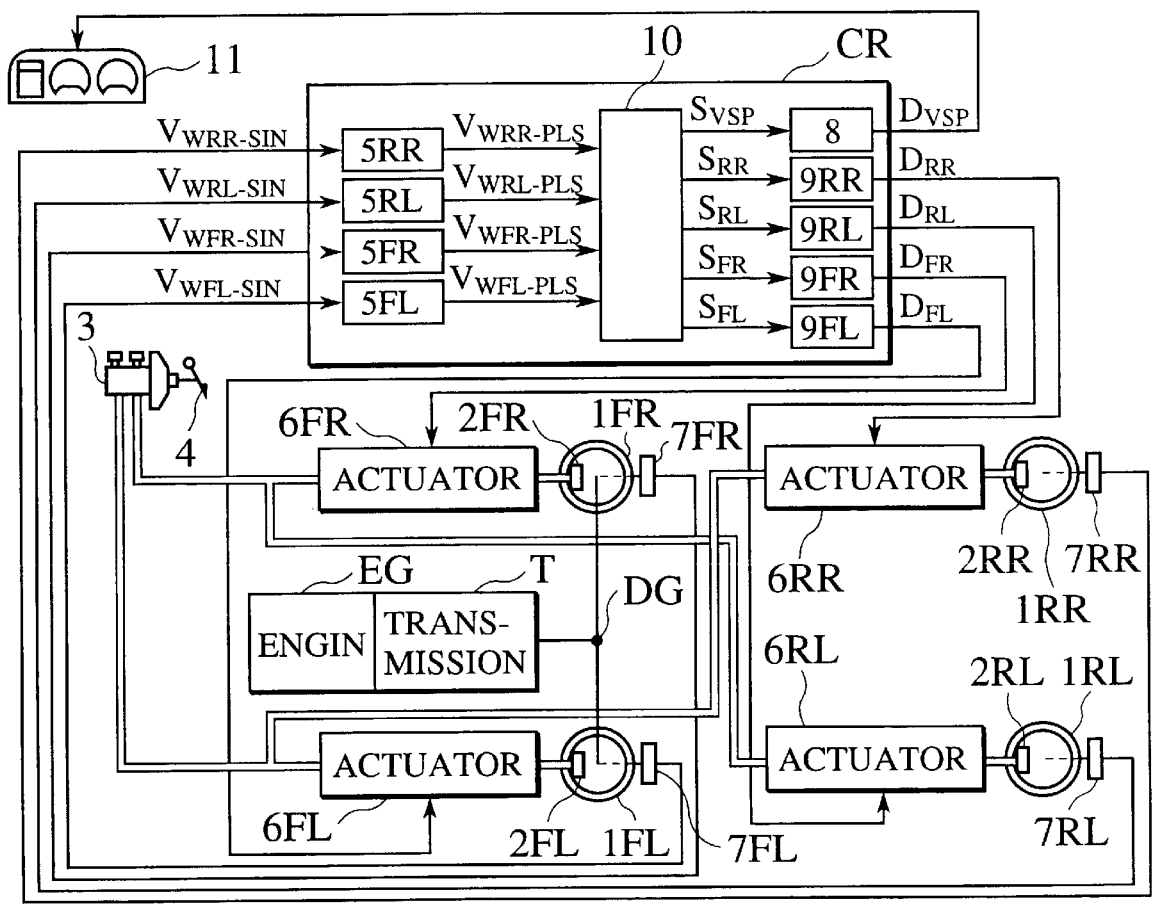
FIG. 1 is a schematic structural diagram showing one example of the application of the vehicle velocity detecting device of the invention on the anti-lock brake control apparatus.

FIG. 1 shows one application that the vehicle velocity detecting device of the invention is applied to an anti-lock brake control apparatus of the FF (front engine and front drive) vehicle.

In the figure, reference numerals 1FL and 1FR designate left and right wheels on the front side of the vehicle and 1RL and 1RR do left and right wheels on the rear side of the vehicle, respectively. The rotational driving force originating in an engine EG is transmitted to the front wheels 1FL, 1FR through the intermediary of a transmission T and a differential gear DG furthermore. The respective wheels 1FL to 1RR have wheel cylinders 2FL to 2RR attached thereto for braking them, respectively. Further, four wheel rotating speed sensors 7FL to 7RR are attached to the wheels 1FL to 1RR respectively, for outputting sinusoidal wave signals corresponding to respective wheel rotating speeds. Note, in this specification, the above wheel rotating speed will be simply referred to "wheel speed", hereinafter. This braking system using the wheel cylinders 2FL to 2RR is identical to the so-called "disc braking apparatus" where respective braking pads are to be urged against respective disc rotors of the wheels.

In the wheel cylinders 2FL to 2RR, the front and left wheel cylinder 2FL and the rear and right wheel cylinder 2RR are together connected with one line of a master cylinder 3, while the front and right wheel cylinder 2FR and the rear and left wheel cylinder 2RL are together connected with the other line of the master cylinder 3, providing the so-called diagonal split type of piping structure. Further, respectively interposed between each wheel cylinder 2FL to 2RR and the master cylinder 3 are anti-lock brake control actuators 6FL to 6RR each of which serves so as not to block the master cylinder's pressure as the original pressure. Therefore, this anti-lock brake control apparatus is constructed by a system of four sensors and four channels as a whole. Note, as occasion demands, the apparatus may be equipped with a pressure sensor for detecting the master cylinder's pressure of each line from the master cylinder 3, a brake switch which is activated when the driver steps on a brake pedal thereby to generates a brake switch signal, a lateral acceleration sensor for detecting an acceleration applied on the vehicle laterally, or the like.

As usual, each of the actuators 6FL to 6RR includes a solenoid inlet valve interposed between the master cylinder 3 and each wheel cylinder 2FL to 2RR; a series circuit consisting of a solenoid outlet valve connected parallel with the solenoid inlet valve, a pump and a check valve; and an accumulator connected between the solenoid outlet valve and the pump. Then, the operations of the solenoid inlet and outlet valves and the pumps for the respective actuators 6FL to 6RR are controlled by hydraulic control driving signals $D_{FL}$, $D_{FR}$, $D_{RL}$, $D_{RR}$ outputted from a control unit CR which have the wheel speeds $Vw_{FL}$, $Vw_{FR}$, $Vw_{RL}$, $Vw_{RR}$ inputted thereto through the wheel speed sensors 7FL to 7RR and which may have the brake switch signal inputted through the brake switch, the master cylinder's pressure detection signals from the pressure sensors and the lateral acceleration detection signal from the lateral acceleration signal, as occasion demands.

Figure 2:
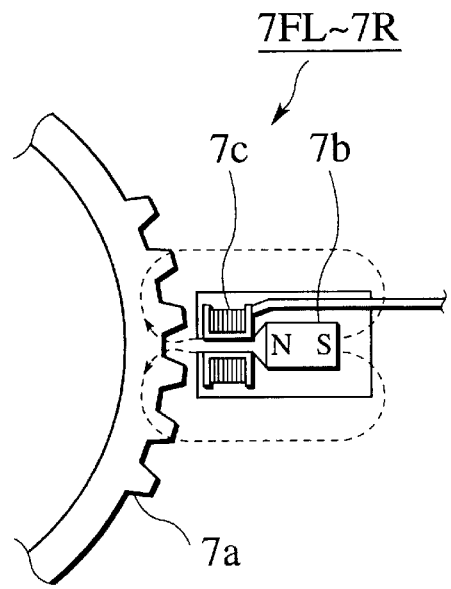
FIG. 2 is an explanatory diagram showing an example of a wheel speed sensor in FIG. 1.

Next, we describe the structure and operation of the wheel speed sensors 7FL to 7RR in brief. The wheel speed sensors 7FL to 7RR are respectively arranged in designated positions in respective hub portions bearing the wheels individually. As shown in FIG. 2, each of the sensors 7FL to 7RR comprises a rotor 7a having the designated number of serration teeth formed on the outer periphery and a coil 7c which has an opposing magnet 7b accommodated therein and detects the dielectric electromotive force due to magnetic flux generated by the magnet 7b. That is, each of the wheel speed sensors 7FL to 7RR is adapted such that an electromotive force is induced in the coil 7c, the frequency of electromotive force corresponding to the rotating velocity of the serration of the rotor 7a. In this way, the outputs of the wheel speed sensors 7FL to 7RR are represented by sinusoidal wave currents brought by the respective dielectric electromotive forces.

While, the control unit CR comprises wheel-speed input circuits 5FL to 5RR, a microcomputer 10, output circuits 9FL to 9RR for anti-lock brake control and an output circuit 8 for detecting the vehicle velocity. In the unit CR, the wheel-speed input circuits 5FL to 5RR convert wheel-speed sinusoidal wave signals $Vw_{FL-SIN}$, $VW_{FR-SIN}$, $VW_{RL-SIN}$, $VW_{RR-SIN}$ provided from the wheel speed sensors 7FL to 7RR into wheel-speed rectangular wave signals $Vw_{FL-PLS}$, $VW_{FR-PLS}$, $VW_{RL-PLS}$, $VW_{RR-PLS}$ by their own appropriate circuits, for example, the Schmitt trigger circuits. Based on these converted signals and also dynamic radii of the rotating tires of the respective wheels 1FL to 1RR, the microcomputer 10 calculates the circumferential wheel speeds $VW_{FL}$ to $VW_{RR}$ and further carries out the anti-lock brake control and the calculation for detecting the vehicle velocity on the basis of the resultant speeds $VW_{FL}$ to $VW_{RR}$ and the master cylinder's pressure, the lateral acceleration, or the like. The output circuits 9FL to 9RR for the anti-lock brake control do convert "anti-lock brake control" signals $S_{FL}$ to $S_{RR}$ from the microcomputer 10 into "anti-lock brake drive" signals $D_{FL}$ to $D_{RR}$ respectively and subsequently, the circuits 9FL to 9RR output them. Similarly, the output circuit 8 for detecting the vehicle velocity does convert a vehicle speed signal $S_{vsp}$ from the microcomputer 10 into a "velocity meter drive" signal $D_{vsp}$ and subsequently outputs it.

Figure 3:
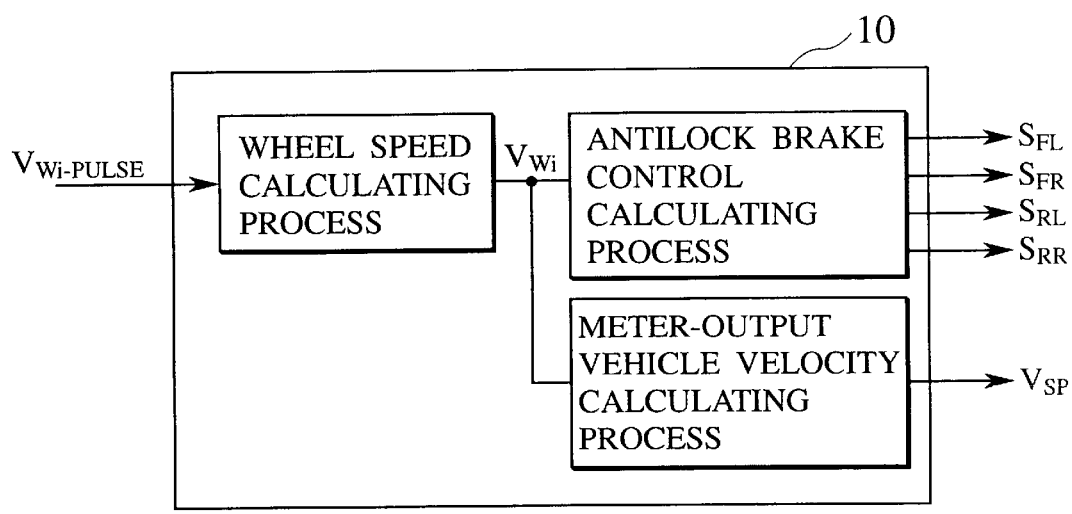
FIG. 3 is a block diagram of calculating processes executed in a microcomputer of FIG. 1.

FIG. 3 is a block diagram showing various sorts of calculations executed by the microcomputer 10. In the microcomputer 10, there are executed a wheel-speed calculating process for calculating the wheel speed $Vw_i$ (i=FL~RR) from the wheel-speed rectangular wave signals $VW_{FL-PLS}$, $VW_{FR-PLS}$, $VW_{RL-PLS}$, $VW_{RR-PLS}$ as the result of the conversion at the wheel-speed input circuits 5FL to 5RR; an anti-lock brake control calculating process for generating the "anti-lock brake control" signals $S_{FL}$ to $S_{RR}$ to the respective actuators 6FL to 6RR in order to prevent the wheels from being locked on the basis of the calculated wheel speed $Vw_i$; and a meter output calculating process for calculating and generating the vehicle velocity signal $S_{vsp}$ to a velocity meter 11 in the instrumental panel on the basis of the calculated wheel speed $Vw_i$, similarly.

Figure 4:
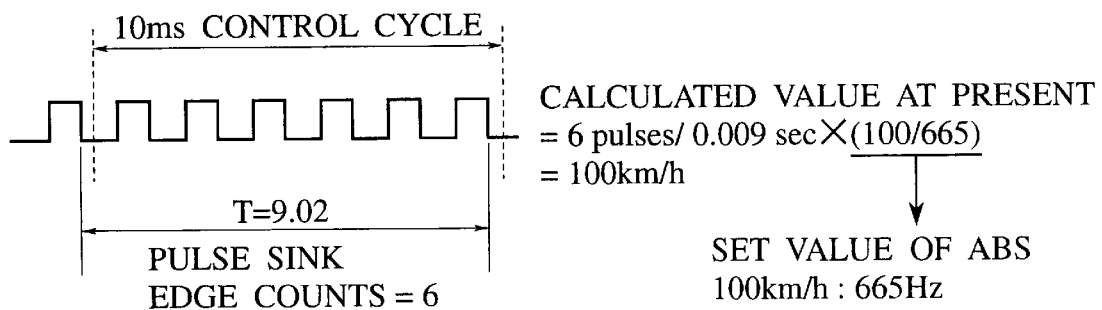
FIG. 4 is a diagram for explanation of the calculating process to calculate the wheel speed executed in the microcomputer of FIG. 1.

A. In the microcomputer 10, the wheel speed calculating process can be accomplished by using elements for detecting the falling of wheel-speed rectangular wave signals $Vw_{i-PLS}$, for example, a comparator, a clock counter, a multiplier, a divider, etc. For example, as shown in FIG. 4, it is executed to detect the number of falling edges of the rectangular wave signals $Vw_{i-PLS}$ contained in a designated control cycle and the time required. Then, by dividing the pulses number of the rectangular waves by the time required and successively multiplying the resultant quotient by the coefficient of conversion for wheel speed, the falling of wheel-speed rectangular wave signals $Vw_{i-PLS}$ can be converted into each wheel speed $Vw_i$. In the shown case, it is established so as to realize the wheel speed of 100 km/h by 665 pulses of wheel-speed rectangular wave signals $Vw_{i-PLS}$, in other words, the signals having a frequency of 665 Hz. For example, if 6 pulses are detected in the period of 9 msec., it is found that the wheel speed $Vw_i$ amounts to 100 km/h by the following expression (1):

$$6 \text{ pulses}/0.009 \text{ sec.} \times (100/665) = 100 \text{km/h} \tag{1}$$

Further, in the anti-lock brake control calculating process, it is executed to calculate an estimated vehicle velocity $V_{sp}$, which is closer to the actual vehicle velocity in comparison with the vehicle velocity outputted on the meter, on the basis of the wheel speeds $Vw_F$ to $VW_{RR}$ and also calculate the wheel acceleration (deceleration) $\dot{V}w_{FL}$ to $\dot{V}w_{RR}$ as the time differential values of the wheel speeds $Vw_{FL}$ to $VW_{RR}$, and the slip ratio $S_{FL}$ to $S_{RR}$ resulting by dividing the deviation between each wheel speed $Vw_F$ to $VW_{RR}$ the estimated vehicle velocity $V_x$ by the same velocity $V_x$. Based on these factors, it is carried out to establish the mode (increase, decrease or maintain) for controlling hydraulic pressure in the wheel cylinders 2FL to 2RR of the respective wheels 1FL to 1RR and output the anti-lock brake control signals $S_{FL}$ to $S_{RR}$ against the actuators 6FL to 6RR, corresponding to the respective mode.

Note, since the operational frequency of the microcomputer 10 is extremely high, it is constructed so as to output the rectangular wave control signals of digital data having modulated pulse width, while the output circuits 8, 9FL to 9RR simply serve to convert or amplify the above signals to the drive signals suitable for the operation of the respective actuators.

Next, we describe a calculation process to calculate the vehicle velocity for meter output executed by the microcomputer, with reference to a flow chart of FIG. 5. Note, the calculation process is executed at predetermined sampling intervals $\Delta T$ (e.g. 10 msec.) as the so-called timer interrupting process. Although the below-mentioned calculation process does not contain a communication step for the resultant vehicle velocity, a program, maps or data required for the communication may be loaded from a memory unit by a processing unit in the microcomputer and conversely, the calculated data provided by the processing unit may be renewed and stored in the memory unit, as occasion demands.

In the calculation process, at step Si, it is executed to read the wheel speed $Vw_i$ resulting from the above wheel speed calculating process.

At next step S2, it is executed to calculate the average of respective wheel speeds of the wheels mainly subjected to the driving force, for example, a mean of the left and right wheels' speeds on the front side of the vehicle in this embodiment, in accordance with the following expression (2).

$$VW_{Dave} = (VW_{DL} + VW_{DR})/2 \qquad (2)$$

Note:
in case of a front driving vehicle: D=F
in case of a rear driving vehicle: D=R At next step S3, it is judged whether or not the average drive wheel speed $VW_{Dave}$ calculated at step S2 is more than a predetermined vehicle velocity Vo, for example, 20 km/h. If the judgment is Yes, then the routine goes to step S5. While, if the judgment is No, then the routine goes to step S4.

At step S4, it is judged in accordance with not-shown individual calculating process whether or not the vehicle at present is under the small turning condition. When the vehicle is under the small turning condition, the routine goes to step S7. If not, then the routine goes to step S6. Note, the above small turning condition means that the vehicle is traveling along a relatively small circle and the judgment may be attained by either judging whether or not the lateral acceleration detected by the lateral acceleration sensor is more than a designated value or judging whether a difference $\Delta Vw_u$ between non-driven left and right wheel speeds $Vw_{UL}$ and $VW_{UR}$, that is, the difference in wheel speed between the left and right wheels $Vw_{RL}$ and $VW_{RR}$ on the rear side of the vehicle in the embodiment, is more than a designated value. This is because, when the vehicle is traveling under the small turning condition, the lateral acceleration gets larger at a constant vehicle velocity or the difference in rotating speed between inside and outside non-driven wheels gets larger.

At step S5, it is executed to set the average drive wheel speed $Vw_{Dave}$ to the vehicle velocity $V_{sp}$ and thereafter, the routine goes to step S8.

Again, at step S6, the smallest wheel speed $Vw_{min}$ is selected from the four wheel speeds $Vw_{FL}$ to $VW_{RR}$ and subsequently set to the vehicle velocity $V_{sp}$ and thereafter, the routine goes to step S8.

Alternatively, at step S7, the third wheel speed $Vw_{3rd}$ of the four wheel speeds $Vw_{FL}$, to $VW_{RR}$ is selected from the largest one and subsequently set to the vehicle velocity $V_{sp}$ and thereafter, the routine goes to step S8.

At next step S8, it is executed to renew the vehicle velocity $V_{sp}$ established at steps S5 to S7 in accordance with not-shown individual calculating processes. Additionally, it is carried out to form and output the vehicle velocity signal $S_{vsp}$ corresponding to the renewed vehicle velocity $V_{sp}$ and finally, the routine is returned to the main program.

We now the detailed operation in the vehicle velocity calculating process of FIG. 5. In the calculating process, the establishment of vehicle velocity $V_{sp}$ is changed on whether or not the average drive wheel speed $VW_{Dave}$ calculated at step S2 is more than the designated vehicle velocity Vo, for example, 20 km/h. That is, as mentioned above, the noise is caused during the vehicle's traveling at extremely low speed in the embodiment and therefore, the detected wheel speed $Vw_i$ is influenced by vibrations between the corresponding rotor disc and the corresponding brake pad. Consequently, the wheel speed $Vw_i$ may be detected as if it were approx. 15 km/h. From this point of view, there is prepared a new value for the designated vehicle velocity Vo, which is somewhat larger than the above designated value. Thus, when the average drive wheel speed $VW_{Dave}$ is more than the designated vehicle velocity Vo, then the routine goes from step 3 to step S5 where the average drive wheel speed $Vw_{Dave}$ is set to the vehicle velocity $V_{sp}$, so that it is possible to obtain the A outputs similar to that of the earlier vehicle velocity sensor for converting the rotating speed of an output shaft of the transmission.

While, when the average drive wheel speed $Vw_{Dave}$ is less than the designated vehicle velocity Vo and the vehicle is in the great turning condition containing the vehicle's traveling straight on ahead, in other words, the vehicle is not in the small turning condition, then the routine goes from step 3 to step S6 via step S4. At step S6, it is-executed to select the smallest wheel speed $Vw_{min}$ and set it to the vehicle velocity $V_{sp}$. That is, in the velocity range where there is a possibility of the detected wheel speed $Vw_i$ being influenced by the noise, since the smallest wheel speed $Vw_{min}$ is selected and regarded as the vehicle velocity $V_{sp}$, it is possible to detect more accurate vehicle velocity $V_{sp}$ while excluding the wheel speed $Vw_i$ subjected to the great influence of noise.

On the contrary, when the average drive wheel speed $Vw_{Dave}$ is less than the designated vehicle velocity Vo and the vehicle is in the small turning condition, then the routine goes from step S4 to step S7 where the third wheel speed $Vw_{3rd}$ from the largest one is selected and subsequently set to the vehicle velocity $V_{sp}$. It is noted that when the vehicle makes such a small turn as judged in the above way, a great difference in wheel speed between the inside turning wheel and the outside turning wheel is produced and especially, the inside wheel speed is apt to get smaller than the actual vehicle velocity. Therefore, in the velocity range having a possibility of the detected wheel speed $Vw_t$ being influenced by the noise and when the vehicle is in the small turning condition, the establishment of the third wheel speed $Vw_{3rd}$ from the largest one as the vehicle velocity $V_{sp}$ allows more accurate vehicle velocity $V_{sp}$ to be detected while excluding the inside wheel speed in the small turning condition. Further, in the range where the average drive wheel speed $Vw_{Dave}$ is less than the designated vehicle velocity Vo, it is possible to eliminate the drive wheel speed at the vehicle's slipping in either case. Note, such a wheel speed is apt to occur at the vehicle's starting to travel and appears larger than the actual vehicle velocity. Therefore, it is also possible to detect more accurate vehicle velocity Vsp.

From the above description, it will be understood that the wheel speed sensors 7FL to 7RR and the process at step S4 of FIG. 5 of the embodiment together constitute the wheel speed detecting unit (or the first means) of the present invention. Similarly, the process at step S4 of FIG. 5 constitutes the turning condition detecting unit (or the second means) of the invention, the process at step S2 does the average speed detecting unit (or the fourth means), and the process at step S3 constitutes the vehicle velocity detecting unit (or the third means) of the invention.

The entire contents of Japanese Patent Application P10-187331 (filed Jul. 2, 1998) is incorporated herein by reference.

Although the invention has been described above by reference to an embodiment of the invention, the invention is not limited to the embodiment described above. Modifications and variations of the embodiment described above will occur to those skilled in the art, in light of the above teachings. For example, the vehicle velocity detecting device of the invention is applicable to all type of vehicles, such as rear drive vehicles, front drive vehicles, four-wheel drive vehicles and so on. Additionally, although the microcomputer is employed as the control unit in the embodiment, it may be replaced with an assembly of electronic circuits, such as a counter, a comparator and so on. The scope of the invention is defined with reference to the following claims.

What is claimed is:

1. A vehicle velocity detecting device for detecting vehicle velocity of a vehicle by using rotating speeds of at least four wheels of the vehicle, the vehicle velocity detecting device comprising:

a wheel speed detecting unit for detecting the rotating speeds of the four wheels as respective wheel speed, individually;

a turning condition detecting unit for detecting the vehicle's turning condition; and a vehicle velocity detecting unit for detecting the vehicle velocity; wherein when the vehicle's turning condition detected by the turning condition detecting unit is a small turning condition, the vehicle velocity detecting unit does adopt the third wheel speed from the largest one in the respective wheel speeds of the four wheels detected by the wheel speed detecting unit, as the vehicle velocity to be detected; and when the vehicle's turning condition detected by the turning condition detecting unit is a great turning condition containing a straight traveling condition, the vehicle velocity detecting unit does adopt the smallest wheel speed in the respective wheel speeds of the four wheels detected by the wheel speed detecting unit, as the vehicle velocity to be detected.

2. The vehicle velocity detecting device of claim 1, further comprising an average speed detecting unit for detecting an averaged driving wheels' rotating speed from an average of the rotating speeds of two wheels associated with the vehicle's driving force mainly, wherein the vehicle velocity detecting unit carries out the detection of vehicle velocity corresponding to the turning condition of the vehicle when the averaged driving wheels' rotating speed detected by the average speed detecting unit is within a predetermined speed range.

3. The vehicle velocity detecting device of claim 2, wherein the predetermined speed range is a speed range where the rotating speeds of the four wheels detected by the wheel speed detecting unit are influenced by noise.

4. The vehicle velocity detecting device of claim 2, wherein, when the averaged driving wheels' rotating speed detected by the average speed detecting unit is not within the predetermined speed range, the vehicle velocity detecting unit adopts the averaged driving wheels' rotating speed as the vehicle velocity.

5. A vehicle velocity detecting device for detecting vehicle velocity of a vehicle by using rotating speeds of at least four wheels of the vehicle, the vehicle velocity detecting device comprising:

first means for detecting the rotating speeds of the four wheels as respective wheel speed, individually;

second means for detecting the vehicle's turning condition; and third means for detecting the vehicle velocity; wherein when the vehicle's turning condition detected by the second means is a small turning condition, the third means does adopt the third wheel speed from the largest one in the respective wheel speeds of the four wheels detected by the first means, as the vehicle velocity to be detected; and when the vehicle's turning condition detected by the second means is a great turning condition containing a straight traveling condition, the third means does adopt the smallest wheel speed in the respective wheel speeds of the four wheels detected by the first means, as the vehicle velocity to be detected.

6. The vehicle velocity detecting device of claim 5, further comprising fourth means for detecting an averaged driving wheels' rotating speed from an average of the rotating speeds of two wheels associated with the vehicle's driving force mainly, wherein the third means carries out the detection of vehicle velocity corresponding to the turning condition of the vehicle when the averaged driving wheels' rotating speed detected by the fourth means is within a predetermined speed range.

* * * * *